US012776901B2

(12) United States Patent
Wang et al.

(10) Patent No.: US 12,776,901 B2
(45) Date of Patent: Oct. 27, 2026

(54) METHOD AND APPARATUS FOR ADDING WATERMARK TO DATA, AND RELATED DEVICE

(71) Applicant: Huawei Cloud Computing Technologies Co., Ltd., Guizhou (CN)

(72) Inventors: Xinyu Wang, Chengdu (CN); Zhongliu Zhuo, Chengdu (CN); Tao Zhu, Dongguan (CN); Quandong Li, Gui'an (CN); Zhonggang Wang, Chengdu (CN); Fei Qu, Chengdu (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 255 days.

(21) Appl. No.: 18/404,775

(22) Filed: Jan. 4, 2024

(65) Prior Publication Data

US 2024/0154795 A1 May 9, 2024

Related U.S. Application Data

(63) Continuation of application No. PCT/CN2022/091963, filed on May 10, 2022.

(30) Foreign Application Priority Data

Jul. 9, 2021 (CN) ......................... 202110780862.0

(51) Int. Cl.
*G06F 21/16* (2013.01)
*H04L 9/08* (2006.01)

(52) U.S. Cl.
CPC ............ *H04L 9/0861* (2013.01); *G06F 21/16* (2013.01); *H04L 2209/608* (2013.01)

(58) Field of Classification Search
CPC ............. H04L 9/0861; H04L 2209/608; H04L 9/3242; H04L 9/0643; G06F 21/16;
(Continued)

(56) References Cited

U.S. PATENT DOCUMENTS 7,630,509 B2 * 12/2009 Zarrabizadeh ..... H04N 1/32144
382/166
8,385,590 B1 * 2/2013 Moorer .............. H04N 21/8358
382/100
(Continued)

FOREIGN PATENT DOCUMENTS

CN 104866735 A 8/2015
CN 111125750 A 5/2020
CN 112800394 A 5/2021

OTHER PUBLICATIONS

Wu et al., Sharing and hiding a secret image in color palette images with authentication, Springer, Jul. 2020. (Year: 2020).*
(Continued)

*Primary Examiner* — David Garcia Cervetti
(74) *Attorney, Agent, or Firm* — WOMBLE BOND DICKINSON (US) LLP

(57) ABSTRACT

A plurality of pieces of to-be-processed data are obtained, and a plurality of groups corresponding to the plurality of pieces of to-be-processed data are further obtained. Watermarks are added to to-be-processed data in the target group by using the target group as a granularity. Because watermarks are added to the plurality of pieces of to-be-processed data by using the group as the granularity, although the to-be-processed data in the group is modified due to watermark adding, the to-be-processed data changes within a range of a small amount of to-be-processed data included in the target group, and does not change within a range of the to-be-processed data, thereby alleviating a problem that the data is severely distorted after watermark adding. When
(Continued)

to-be-processed data with similar semantics is placed in a same group, semantics of the to-be-processed data in the target group has a relatively small change after watermark adding.

20 Claims, 5 Drawing Sheets

(58) Field of Classification Search
CPC .......... G06F 16/35; G06F 40/30; G06F 21/64; H04N 1/32144; H04N 1/32229
See application file for complete search history.

(56) References Cited

U.S. PATENT DOCUMENTS 8,855,368 B2 * 10/2014 Tanase ................... G06V 10/50 382/103
10,043,527 B1 * 8/2018 Gurijala ................ G10L 19/018
11,317,128 B1 * 4/2022 Perkalsky ........ H04N 21/23605
11,995,505 B1 * 5/2024 Vincent ............ G06K 19/06103
2001/0025341 A1 * 9/2001 Marshall ............... G06T 1/0071 713/176
2002/0136428 A1 * 9/2002 Sugahara .............. G06T 1/0057 382/100
2003/0204729 A1 * 10/2003 Rockwood ............. H04H 20/31 713/176
2004/0017926 A1 * 1/2004 Tonisson ............... G06T 1/0028 382/100
2005/0055554 A1 3/2005 Sion et al.
2005/0141747 A1 * 6/2005 Shi ..................... H04N 1/32208 382/100
2005/0152549 A1 * 7/2005 Lemma ................... G10L 19/02 704/E19.01
2005/0169498 A1 * 8/2005 Choi ..................... G06T 1/0071 382/100
2006/0095775 A1 * 5/2006 Jajodia .................... G06F 21/64 713/176
2006/0239501 A1 * 10/2006 Petrovic ............. H04N 1/32203 380/54
2006/0239503 A1 * 10/2006 Petrovic .................. H04L 9/002 380/54
2008/0002854 A1 * 1/2008 Tehranchi .......... H04N 1/32352 382/100
2008/0028474 A1 * 1/2008 Horne ................... H04L 9/3226 726/27
2008/0080009 A1 * 4/2008 Masui ................ H04N 1/32309 358/3.28
2008/0098022 A1 * 4/2008 Vestergaard .......... G06T 1/0085 704/E19.009
2008/0198247 A1 * 8/2008 Yonaha ................ H04N 23/611 348/254
2008/0247002 A1 * 10/2008 Au ..................... H04N 1/32203 358/3.28
2009/0022396 A1 * 1/2009 Watanabe ................. G06T 5/00 382/167
2009/0160992 A1 * 6/2009 Inaba ........................ G06T 5/70 348/308
2009/0231455 A1 * 9/2009 Emery ............... H04N 1/32203 348/222.1
2009/0310817 A1 * 12/2009 Park ....................... H04N 5/913 382/100
2010/0043081 A1 * 2/2010 Kiayias ............. H04N 21/2585 713/176
2010/0061587 A1 * 3/2010 Gupta .................... G06V 20/46 382/100
2010/0322469 A1 * 12/2010 Sharma ................. G10L 19/018 707/769
2011/0164684 A1 * 7/2011 Sato ....................... H04N 19/61 375/E7.243
2011/0194690 A1 * 8/2011 Das Gupta ......... H04N 1/32325 380/54
2011/0194725 A1 * 8/2011 Das Gupta ....... G06K 19/06037 382/100
2011/0194726 A1 * 8/2011 Das Gupta ............ G06T 1/0021 382/100
2011/0280305 A1 * 11/2011 Mochizuki ........... H04N 19/593 375/E7.243
2012/0070031 A1 * 3/2012 Kato ..................... G06T 1/0071 382/100
2012/0145779 A1 * 6/2012 Bietenbeck ...... G06K 19/06037 235/494
2012/0155754 A1 * 6/2012 Chen .................... G06V 30/413 382/164
2012/0163653 A1 * 6/2012 Anan .................... G06T 1/0021 382/100
2013/0114847 A1 * 5/2013 Petrovic ............. G06V 30/1914 382/100
2013/0114848 A1 * 5/2013 Petrovic ............. G06V 30/1914 382/100
2013/0117570 A1 * 5/2013 Petrovic ................ G06T 1/0085 713/176
2013/0117571 A1 * 5/2013 Petrovic .................... H04L 9/00 713/176
2014/0129011 A1 * 5/2014 Radhakrishnan ..... G10L 19/018 700/94
2014/0270338 A1 * 9/2014 Zhao ..................... G06T 1/0028 382/100
2014/0293082 A1 * 10/2014 Okumura .............. G06T 3/4053 348/222.1
2017/0061562 A1 * 3/2017 Kim ........................ G06T 1/005
2017/0061565 A1 * 3/2017 Tanaka .................. G06T 1/0028
2017/0064190 A1 * 3/2017 Tamaki ................ H04N 23/667
2019/0294761 A1 * 9/2019 Kim ........................ G06F 21/16
2019/0295208 A1 * 9/2019 Hoarty ................... H04N 5/913
2019/0354711 A1 * 11/2019 Coatrieux ............... G06F 21/16
2020/0004935 A1 * 1/2020 Goldsteen .............. G06N 20/00
2020/0372228 A1 * 11/2020 Rodriguez ............. G06Q 30/00
2020/0380226 A1 * 12/2020 Rodriguez ........... G06V 10/147
2021/0056183 A1 * 2/2021 Zhou .................. H04N 1/32325
2021/0149733 A1 * 5/2021 Cheng .................... G06N 20/00
2021/0150002 A1 * 5/2021 Cheng ..................... G06F 21/16
2021/0152600 A1 * 5/2021 Cheng ................... H04L 9/0643
2021/0157998 A1 * 5/2021 Rodriguez ............. G06V 20/20
2021/0168357 A1 * 6/2021 Toma ................... H04N 19/577
2021/0218970 A1 * 7/2021 Li ........................ H04N 19/159
2021/0233204 A1 * 7/2021 Alattar .................. G06T 1/0028
2021/0258573 A1 * 8/2021 Li ........................ H04N 19/136
2022/0036495 A1 * 2/2022 Reed ...................... G06T 1/0028
2022/0046332 A1 * 2/2022 Singh ................. H04N 21/6581
2022/0121884 A1 * 4/2022 Zadeh .................... G06N 3/006
2022/0166609 A1 * 5/2022 Igarashi ................ H04L 9/3247
2023/0008085 A1 * 1/2023 Ma ........................ G06T 1/0085
2023/0230193 A1 * 7/2023 Kan ...................... G06T 1/0085 382/100
2024/0154795 A1 * 5/2024 Wang ...................... G06F 21/16
2025/0298918 A1 * 9/2025 Potluru ................... G06F 21/16

OTHER PUBLICATIONS

Gul et al., A novel hash function based fragile watermarking method for image integrity, Springer, Oct. 2018. (Year: 2018).*

Reed et al., Watermarking Spot Colors in Packaging, SPIE, 2015. (Year: 2015).*

Prathiwi et al., Watermarking Scheme for Authenticity and Integrity Control of Digital Medical Image using Reed-Muller Codes and Hash Block Chaining, ICIICT, 2015. (Year: 2015).*

Battiato et al., Robust Watermarking for Images Based on Color Manipulation, Springer, 2000. (Year: 2000).*

Tremeau et al., Recent Trends in Color Image Watermarking, Journal of Imaging Science and Technology, Oct. 2008. (Year: 2008).*

Kunhu, Alavi, and Hussain Al-Ahmad. Multi watermarking algorithm based on DCT and hash functions for color satellite images. 2013 9th International Conference on Innovations in Information Technology (IIT). IEEE, 2013. (Year: 2013).*

Radu Sion et al:"Rights Protection for Categorical Data",IEEE Transactions On Knowledge and Data Engineering, vol. 17, No. 7, Jul. 2005, total 15 pages.

(56) References Cited

OTHER PUBLICATIONS

Cai Heyan:"Research On Digital Watermarking Technology For Relational Database Ownership Protection",Dec. 2019, total 55 pages.
Ranco-Contreras Javier et al: "Robust Watermarking of Relational Databases With Ontology-Guided Distortion Control", IEEE Transactions On Information Forensics and Security, IEEE, USA, vol. 10, No. 9, Sep. 1, 2015, total 14 pages.

* cited by examiner

METHOD AND APPARATUS FOR ADDING WATERMARK TO DATA, AND RELATED DEVICE

CROSS-REFERENCE TO RELATED APPLICATIONS

This application is a continuation of International Application No. PCT/CN2022/091963, filed on May 10, 2022, which claims priority to Chinese Patent Application No. 202110780862.0, filed on Jul. 9, 2021. The disclosure of the aforementioned application is hereby incorporated by reference in its entirety.

TECHNICAL FIELD

This application relates to the field of database technologies, and in particular, to a method and an apparatus for adding a watermark to data, and a related device.

BACKGROUND

Digital information technologies such as cloud computing, an internet of things, and artificial intelligence have accumulated a large amount of data in a developing process. Usually, the data can be shared with an internal or external user of an organization to mine potential value of the data, for example, perform intelligent product recommendation or quality assessment based on the data. However, in an actual application scenario, the data may be leaked to an unauthorized user due to, for example, improper protection or a leaker, and consequently an immeasurable loss may be caused to assets and reputation of the organization.

Currently, before providing data, a data owner may add watermark information to the data in an invisible embedding manner, so that source tracing and accountability are performed based on the watermark information when the data is leaked, and a potential user of the leaked data may be deterred to a specific degree, thereby reducing a data leakage probability.

However, when the watermark information is added to the data, the original data is modified. As a result, the data may be severely distorted, making data with the watermark information unavailable.

SUMMARY

This application provides a method for adding a watermark to data, to alleviate a problem that data is distorted after watermark adding while maintaining a capability of performing source tracing by using watermark information. In addition, this application further provides an apparatus for adding a watermark to data, a device, a computer-readable storage medium, and a computer program product.

According to a first aspect, this application provides a method for adding a watermark to data. In some embodiments, a plurality of pieces of to-be-processed data may be obtained, and a plurality of groups corresponding to the plurality of pieces of to-be-processed data may be further obtained. The plurality of groups include a target group, and the target group may be any one of the plurality of groups, or may be some of the plurality of groups. Then, watermarks are added to to-be-processed data in the target group by using the target group as a granularity. Because watermarks are added to the plurality of pieces of to-be-processed data by using the group as the granularity, although the to-be-processed data in the group is modified due to watermark adding, new data obtained by modifying the to-be-processed data still belongs to one piece of to-be-processed data previously placed in the target group. Therefore, after the watermarks are added to the to-be-processed data, the to-be-processed data changes within a range of a small amount of to-be-processed data included in the target group, and does not change within a range of the to-be-processed data, thereby alleviating a problem that the data is severely distorted after watermark adding. In addition, if the plurality of pieces of to-be-processed data are grouped more properly, for example, to-be-processed data with similar semantics may be placed in a same group, the to-be-processed data in the target group may have a smaller data difference after watermark adding, so that a data distortion problem can be more effectively alleviated. In addition, the target group may be some of the plurality of groups. Therefore, during watermark adding, watermarks may be added to only some of the plurality of pieces of to-be-processed data, and remaining to-be-processed data may be prevented from being modified due to watermark adding, so that a data distortion problem can be further alleviated.

In an embodiment, each piece of to-be-processed data includes an attribute value of a target attribute, and the target attribute may be any one of at least one attribute included in the to-be-processed data. In this way, when the watermarks are added to the to-be-processed data in the target group, the watermarks may be added to the to-be-processed data in the target group based on attribute values of the target attribute in the to-be-processed data in the target group. In this way, after the watermarks are added to the to-be-processed data in the target group, attribute values of the target attribute of to-be-processed data including the watermarks still fall within a range of the attribute values included in the target group, and may not belong to an attribute value range corresponding to another group. Therefore, an attribute value change caused after the watermarks are added to the to-be-processed data can be reduced, so that a distortion problem that occurs after the watermarks are added to the to-be-processed data can be alleviated.

In an embodiment, attribute values of the target attribute in different to-be-processed data in a same group have semantics of a same type, and semantics of attribute values of the target attribute in to-be-processed data in different groups belongs to different types. In this way, the plurality of pieces of to-be-processed data may be grouped in advance based on semantics of attribute values of the target attribute in the pieces of to-be-processed data. Therefore, after the watermarks are added to the to-be-processed data in the target group, the attribute values of the target attribute in the to-be-processed data still fall within an attribute value change range corresponding to the group, so that semantics of the attribute values of the target attribute in the to-be-processed data has a relatively small semantics change, thereby effectively preventing the to-be-processed data from being unavailable due to watermark adding.

In an embodiment, an interaction interface may be further presented. The interaction interface may include a plurality of attribute values of the target attribute in the plurality of pieces of to-be-processed data. In this way, when the plurality of groups corresponding to the plurality of pieces of to-be-processed data are obtained, a result of grouping the plurality of pieces of to-be-processed data by a data owner on the interaction interface may be obtained. In this way, the data owner can manually group the plurality of pieces of to-be-processed data based on the attribute values in the to-be-processed data, thereby improving freedom of the data owner for data grouping.

In an embodiment, when the result of grouping the plurality of pieces of to-be-processed data by the data owner on the interaction interface is obtained, specifically, first, a plurality of attribute value groups may be obtained based on an operation of grouping the plurality of attribute values by the data owner on the interaction interface, where different attribute value groups include different attribute values. Then, to-be-processed data having attribute values in a target attribute value group may be placed in a same group, where the target attribute value group is any one of the plurality of attribute value groups. In this way, the plurality of pieces of to-be-processed data may be grouped based on grouping the attribute values by the data owner.

In an embodiment, a key and a hash algorithm that are entered by the data owner on the interaction interface may be further received, where the key and the hash algorithm may be used to determine the watermarks added to the to-be-processed data in the target group. If the target group includes to-be-processed data 1 and to-be-processed data 2, it may be determined, based on the key and the hash algorithm, that a watermark added to the to-be-processed data 1 is the third bit in watermark data (it is assumed that the watermark data includes 32 bits), and it may be determined, based on the key and the hash algorithm, that a watermark added to the to-be-processed data 2 is the fourth bit in the watermark data. In this way, the data owner can customize a password and the hash algorithm required for watermark adding, thereby improving freedom and flexibility of watermark adding and improving user experience.

In an embodiment, when the plurality of groups corresponding to the plurality of pieces of to-be-processed data are obtained, alternatively, the plurality of pieces of to-be-processed data may be divided into the plurality of groups based on attribute values in the plurality of pieces of to-be-processed data. In this way, the plurality of pieces of to-be-processed data can be automatically grouped, so that the data owner does not need to perform manual grouping, thereby reducing operations that need to be performed by the data owner, and improving efficiency of adding the watermarks to the plurality of pieces of to-be-processed data.

In an embodiment, when the plurality of pieces of to-be-processed data are divided into the plurality of groups based on the attribute values in the plurality of pieces of to-be-processed data, specifically, first, semantics of the attribute values of the target attribute in the plurality of pieces of to-be-processed data may be identified, so that the plurality of pieces of to-be-processed data are divided into the plurality of groups based on the semantics of the attribute values of the target attribute in the plurality of pieces of to-be-processed data. For example, clustering may be performed based on the semantics of the attribute values of the target attribute in the plurality of pieces of to-be-processed data, so that each type corresponds to one group. In this way, different groups in the plurality of obtained groups correspond to attribute value semantics of different types.

In an embodiment, watermark data added to the plurality of pieces of to-be-processed data includes an error-correcting code. In other embodiments, the watermark data may be other data, for example, a bit string that includes 0s and/or 1s.

In an embodiment, the target group is any one of the plurality of groups. Therefore, during watermark adding, watermarks may be added to to-be-processed data in each group, to add corresponding watermark information to the to-be-processed data.

This application provides an apparatus for recommending a third-party library. The apparatus for recommending a third-party library includes modules configured to implement the method for recommending a third-party library in any one of the first aspect or implementations of the first aspect.

According to a third aspect, this application provides an apparatus for adding a watermark to data. The apparatus includes modules configured to implement the method for adding a watermark to data in any one of the first aspect or implementations of the first aspect.

According to a fourth aspect, this application provides a computing device. The computing device includes a processor and a memory. The memory is configured to store instructions. When the computing device runs, the processor executes the instructions stored in the memory, to enable the computing device to perform the method for adding a watermark to data in any one of the first aspect or the implementations of the first aspect. It should be noted that the memory may be integrated into the processor, or may be independent of the processor. The computing device may further include a bus. The processor is connected to the memory by using the bus. The memory may include a readable memory and a random access memory.

According to a fifth aspect, this application provides a computer-readable storage medium. The computer-readable storage medium stores instructions. When the instructions run on a computing device, the computing device is enabled to perform the method for adding a watermark to data in any one of the first aspect or the implementations of the first aspect.

According to a sixth aspect, this application provides a computer program product including instructions. When the computer program product runs on a computing device, the computing device is enabled to perform the method for adding a watermark to data in any one of the first aspect or the implementations of the first aspect.

In this application, the implementations provided in the foregoing aspects may be further combined to provide more implementations.

DESCRIPTION OF EMBODIMENTS

In the specification, claims, and accompanying drawings of this application, the terms such as "first" and "second" are intended to distinguish between similar objects but do not necessarily describe a specific order or sequence. It should be understood that the terms used in such a manner are interchangeable in proper circumstances, and this is merely a distinguishing manner used when objects with a same attribute are described in the embodiments of this application.

Figure 1:
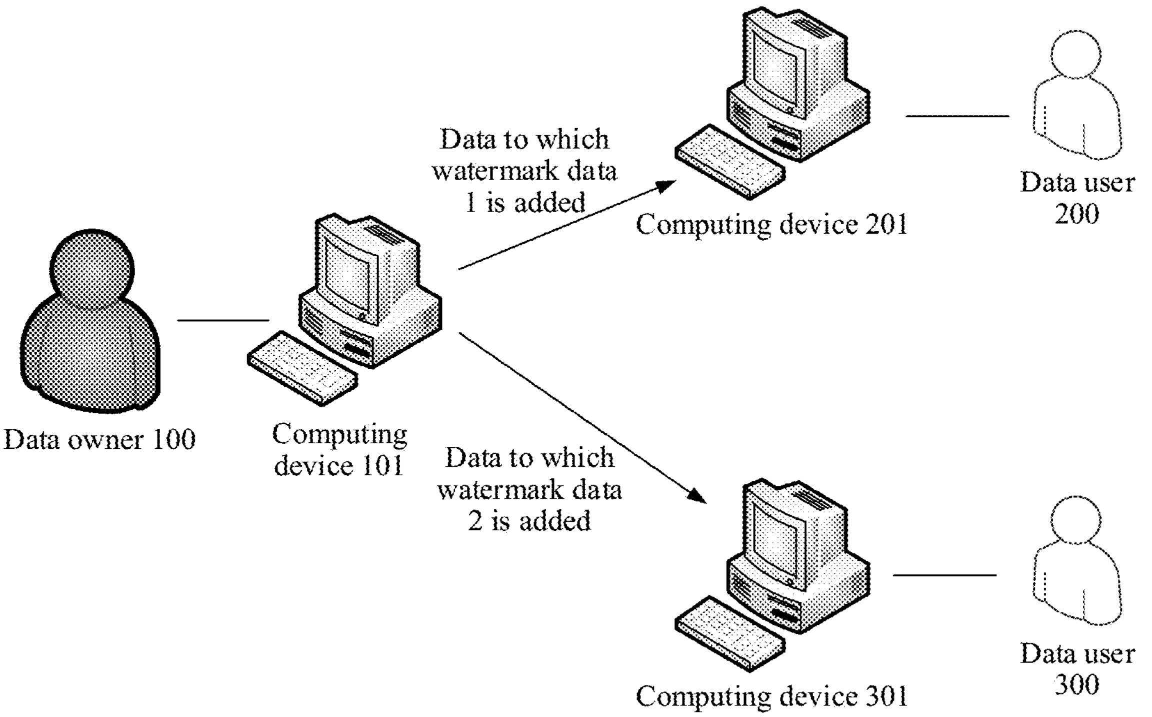
FIG. 1 is a schematic diagram of an example application scenario according to an embodiment of this application.

FIG. 1 is a schematic diagram of an application scenario according to an embodiment of this application. In this scenario, a data owner 100 may separately provide a plurality of pieces of to-be-processed data in a database for a data user 200 and a data user 300. In actual application, the data owner 100 may provide data for more data users. Before providing the plurality of pieces of to-be-processed data, the data owner 100 may add watermark data 1 to the plurality of pieces of to-be-processed data by using a computing device 101, and send, to the data user 200 by using the computing device 101 (or another device), a plurality of pieces of to-be-processed data to which the watermark data 1 is added. The data user 200 may receive the data by using a computing device 201. In addition, the data owner 100 may add watermark data 2 to the plurality of pieces of to-be-processed data by using the computing device 101, and send, to the data user 300 by using the computing device 101, a plurality of pieces of to-be-processed data to which the watermark data 2 is added. The data user 300 may receive the data by using a computing device 301.

The watermark data is secret information that is embedded in the database to perform copyright tracking for the database, and may be, for example, a character or bit string. In this way, when determining that data leakage occurs, the data owner 100 may extract watermark data from leaked data. If the extracted watermark data matches the watermark data 1, the data owner 100 may determine that data leakage exists when the data user 200 uses the plurality of pieces of to-be-processed data. If the extracted watermark data matches the watermark data 2, the data owner 100 may determine that data leakage exists when the data user 300 uses the plurality of pieces of to-be-processed data.

In actual application, when adding watermarks to a plurality of pieces of to-be-processed data in the database, the computing device 101 may encode watermark data into a bit string (if the watermark data is entered in a form of a bit string, encoding may not be performed), and then may split the bit string into one or more bits by using a corresponding algorithm, and add different bits to different to-be-processed data in the database. For example, some bits in bit strings corresponding to the to-be-processed data in the database are replaced with a same quantity of bits in the bit string corresponding to the watermark data. In this way, the watermark data can be embedded in the database. However, in this manner of adding watermarks to a plurality of pieces of to-be-processed data in the database, semantics of to-be-processed data having a watermark has a relatively large change after modification, and consequently the to-be-processed data that has the watermark and that is provided by the data owner 200 to the data user 200 or the data user 300 is unavailable.

Figure 2:
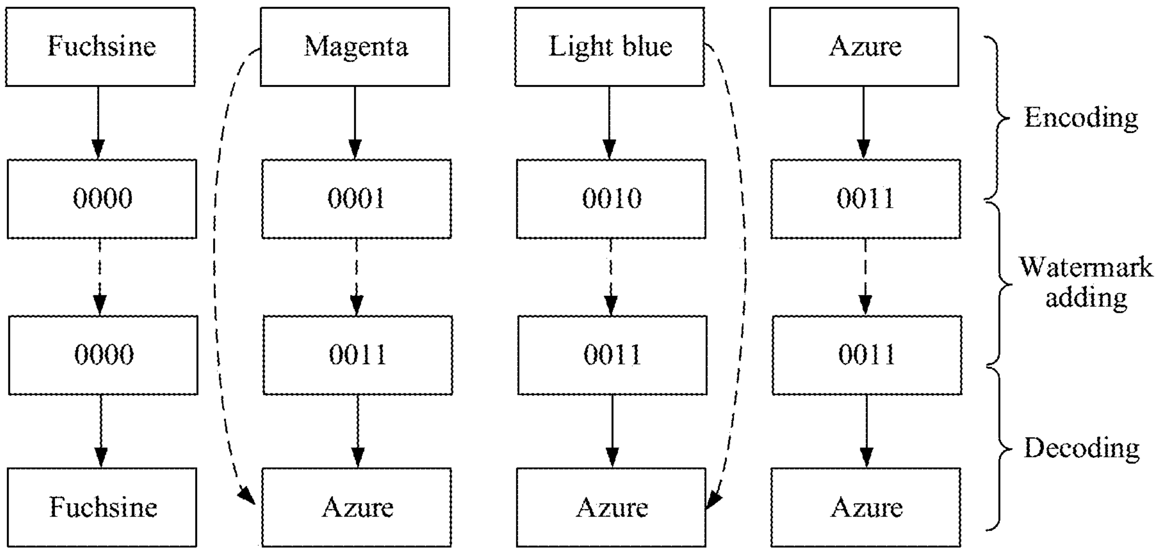
FIG. 2 is a schematic diagram of adding watermarks to four pieces of data.

For example, it is assumed that the database includes four pieces of data, and attribute values of a color attribute in the four pieces of data are sequentially "fuchsia", "magenta", "light blue", and "azure". In this case, in a process of adding watermarks to the four pieces of data, the attribute values of the color attribute in the four pieces of data may be first separately encoded to sequentially obtain bit strings "0000", "0001", "0010", and "0011". It is assumed that bits for adding watermarks to "magenta" and "light blue" are both "11". In this case, after watermark adding, a bit string corresponding to "magenta" is modified into "0011", and a bit string corresponding to "light blue" is modified into "0011", as shown in FIG. 2. After watermark adding, bit strings are decoded to obtain the following attribute values in the four pieces of data: "fuchsia", "azure", "azure", and "azure" in sequence. Therefore, after watermark adding, the attribute values of the color attribute in the four pieces of data are changed as follows: "magenta" is changed to "azure" and "light blue" is changed to "azure". (Herein, adding watermarks to two pieces of data is used as an example. In actual application, watermarks may be added to the data.) Although an attribute value in the third piece of data is changed from "light blue" to "azure", the attribute value still has "blue" information. Therefore, after watermark adding, the third piece of data has a relatively small semantics deviation and a relatively small color information loss. However, an attribute value in the second piece of data is changed from "magenta" to "azure". The two colors are not associated with each other. Therefore, after watermark adding, the second piece of data has a relatively large semantics deviation and a relatively large color information loss. In actual application, there is a relatively high probability that the second piece of data is unavailable after watermark adding.

Based on this, the embodiments of this application provide a method for adding a watermark to data, to alleviate a problem that data is distorted after watermark adding, and prevent, as much as possible, that the data from being unavailable after watermark adding. For example, the computing device 101 first obtains a plurality of pieces of to-be-processed data (for example, the foregoing data that needs to be provided for the data user 200 or the data user 300) to which watermarks need to be added, for example, the foregoing data in which the attribute values are sequentially "fuchsia", "magenta", "light blue", and "azure". Then, the computing device 101 may further obtain a plurality of groups corresponding to the plurality of pieces of to-be-processed data, where the plurality of groups include a target group. After obtaining the plurality of groups based on the plurality of pieces of to-be-processed data, the computing device 101 adds watermarks to to-be-processed data in the target group by using the target group as a granularity.

Because watermarks are added to the plurality of pieces of to-be-processed data by using the group as the granularity, although the to-be-processed data in the group is modified due to watermark adding, new data obtained through modification still belongs to one piece of to-be-processed data previously placed in the target group. Therefore, after the watermarks are added to the to-be-processed data, the to-be-processed data changes within a range of a small amount of to-be-processed data included in the target group, and does not change within a range of the to-be-processed data, thereby alleviating a problem that the data is severely distorted after watermark adding. In addition, if the plurality of pieces of to-be-processed data are grouped more properly, for example, to-be-processed data with similar semantics may be placed in a same group, the to-be-processed data in the target group may have a smaller data difference after watermark adding, so that a data distortion problem can be more effectively alleviated. In addition, the target group may be some of the plurality of groups. Therefore, during watermark adding, watermarks may be added to only some of the plurality of pieces of to-be-processed data, and remaining to-be-processed data may be prevented from being modified due to watermark adding, so that a data distortion problem can be further alleviated. This can effectively alleviate a severe data distortion problem while maintaining a capability of implementing source tracing by using watermark information.

Figure 3:
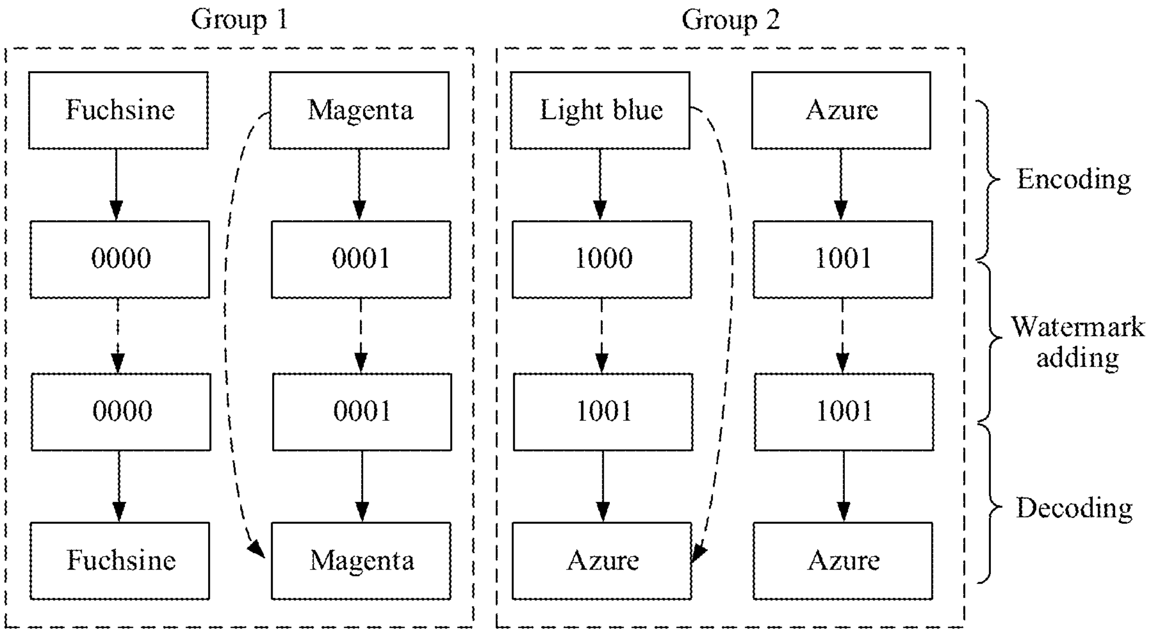
FIG. 3 is another schematic diagram of adding watermarks to four pieces of data.

The foregoing four pieces of data in which the attribute values of the target attribute are sequentially "fuchsia", "magenta", "light blue", and "azure" are still used as an example, as shown in FIG. 3. When watermarks need to be added to the four pieces of data, first, the first piece of data and the second piece of data may be placed in a group 1 based on "fuchsia" and "magenta", and the third piece of data and the fourth piece of data may be placed in a group 2 based on "light blue" and "azure". In a process of encoding data in different groups, bit strings corresponding to the data in the different groups may be distinguished from each other by using most significant bits. As shown in FIG. 3, bit strings obtained by encoding the attribute values in the first piece of data and the second piece of data that are placed in the group 1 are "0000" and "0001", and bit strings obtained by encoding the attribute values in the third piece of data and the fourth piece of data that are placed in the group 2 are "1000" and "1001", that is, a most significant bit of a bit string corresponding to the group 1 is 0, and a most significant bit of a bit string corresponding to the group 2 is 1. In a process of adding watermarks to data in each group, because each group includes two pieces of data, a part "11" of a bit string of watermark data may be split into two bits "1" and "1". The two bits are respectively added to the data in the group 1 and the data in the group 2, and are added to the last bits of bit strings corresponding to the groups. For example, watermarks are added to the second piece of data placed in the group 1 and the third piece of data placed in the group 2. After a watermark is added to the second piece of data, a bit string corresponding to "magenta" is updated from "0001" to "0001" (remains unchanged). After a watermark is added to the third piece of data, a bit string corresponding to "light blue" is updated from "1000" to "1001". Correspondingly, when bit strings having watermark information are subsequently decoded, attribute values respectively corresponding to the four pieces of data are sequentially "fuchsia", "magenta", "azure", and "azure". In this way, after watermark adding, color information in the second piece of data remains unchanged and is still "magenta", and color information in the third piece of data is changed from "light blue" to "azure", but still has "blue" information. Therefore, after watermark adding, the second piece of data and the third piece of data have a relatively small color information loss.

In actual application, the foregoing method for adding a watermark to data may be implemented by hardware with a computing capability, where the hardware may be, for example, a computing device such as a server, or may be implemented by using an application-specific integrated circuit (ASIC) or a programmable logic device (PLD). The PLD may be a complex programmable logical device (CPLD), a field-programmable gate array (FPGA), generic array logic (GAL), or any combination thereof to implement a function of the foregoing network element or module. Alternatively, the foregoing method for adding a watermark to data may be implemented by software. For example, the computing device 101 may download, install, and run a corresponding plug-in, to enable the computing device 101 to implement the foregoing method.

For ease of understanding, the following describes the embodiments of this application with reference to the accompanying drawings.

Figure 4:
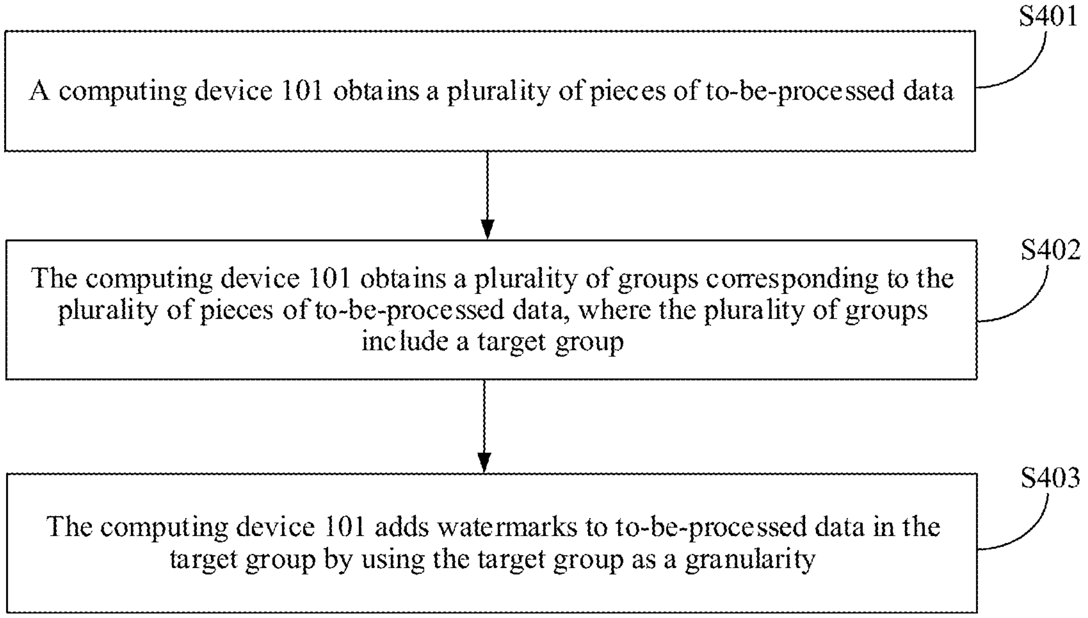
FIG. 4 is a schematic flowchart of a method for adding a watermark to data according to an embodiment of this application.

FIG. 4 is a schematic flowchart of a method for adding a watermark to data according to an embodiment of this application. A method procedure shown in FIG. 4 may be implemented by the foregoing computing device 101. For ease of understanding and description, the following provides example descriptions by using an example in which the method for adding a watermark to data shown in FIG. 4 is applied to the computing device 101 shown in FIG. 1. The method may include the following operations.

S401: The computing device 101 obtains a plurality of pieces of to-be-processed data.

In actual application, a data owner 100 may operate and maintain at least one database, and the database may include a plurality of pieces of to-be-processed data provided for a data user 200 (or a data user 300). For example, the plurality of pieces of to-be-processed data may constitute a data set (data set) in the database. The data set is a set of structured data, and may be represented in a form of a table. Data of each row in the table may be one piece of to-be-processed data. In addition, the data of each row may include a plurality of columns. Data of one of the plurality of columns is used as an identifier, for example, a number, of the to-be-processed data in the data set. Data of one or more remaining columns in the plurality of columns is used as an attribute value of the to-be-processed data. Data of each column corresponds to one attribute of the to-be-processed data.

Figure 5:
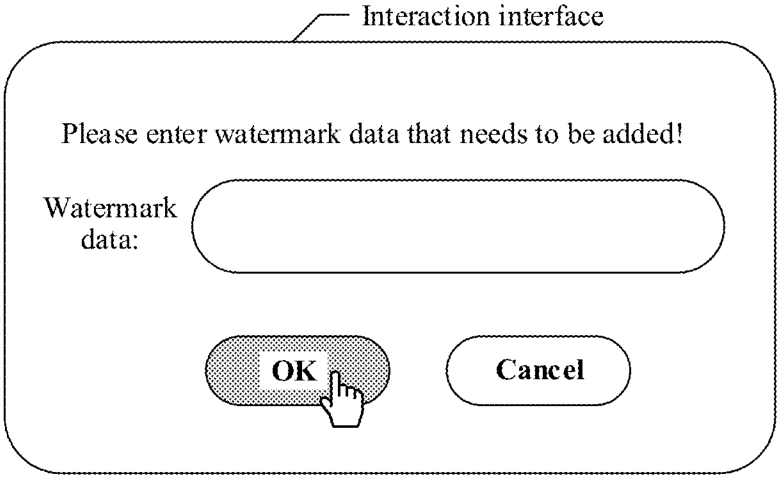
FIG. 5 is a schematic diagram of an interaction interface according to an embodiment of this application.

Before providing the plurality of pieces of to-be-processed data for the data user 200 (or the data user 300), the data owner 100 may add watermarks to the plurality of pieces of to-be-processed data by using the computing device 101. Therefore, the data owner 100 may enter, into the computing device 101, the plurality of pieces of to-be-processed data that need to be provided. Further, the data owner 100 may further enter, into the computing device, watermark data that needs to be added. As an example, when obtaining the plurality of pieces of to-be-processed data, the computing device 101 may present an interaction interface shown in FIG. 5 to the data owner 100, so that the data owner 100 enters, on the interaction interface, the watermark data that needs to be added. In other embodiments, the computing device 101 may automatically generate watermark data for the plurality of pieces of to-be-processed data, for example, may use related information of the data user 200 (or the data user 300) as the watermark data. In this embodiment, a specific implementation in which the computing device 101 obtains the watermark data is not limited.

In some actual application scenarios, for the to-be-processed data provided by the data owner 100, the computing device 101 may add a watermark to only a part of the to-be-processed data, and remaining to-be-processed data may be specified by the data owner 100 or independently determined by the computing device 101. In this way, a data amount of to-be-processed data processed by the computing device 101 can be reduced, and efficiency of adding a watermark by the computing device 101 can be improved. Correspondingly, in this embodiment, the plurality of pieces of to-be-processed data to which the watermark data is to be added may be a part of or all of the data provided by the data owner 100 for the data user 200 (or the data user 300).

S402: The computing device 101 obtains a plurality of groups corresponding to the plurality of pieces of to-be-processed data, where the plurality of groups include a target group.

The target group may be any one of the plurality of groups. In this way, the computing device 101 may subsequently perform a watermark adding processing process on the to-be-processed data in the groups. In other embodiments, the target group may be some of the plurality of groups. In this way, the computing device 101 may subsequently process to-be-processed data (a part of the plurality of obtained to-be-processed data) in only some of the groups. For ease of understanding, the following provides example descriptions by using an example in which the target group is any one of the plurality of groups.

Figure 6:
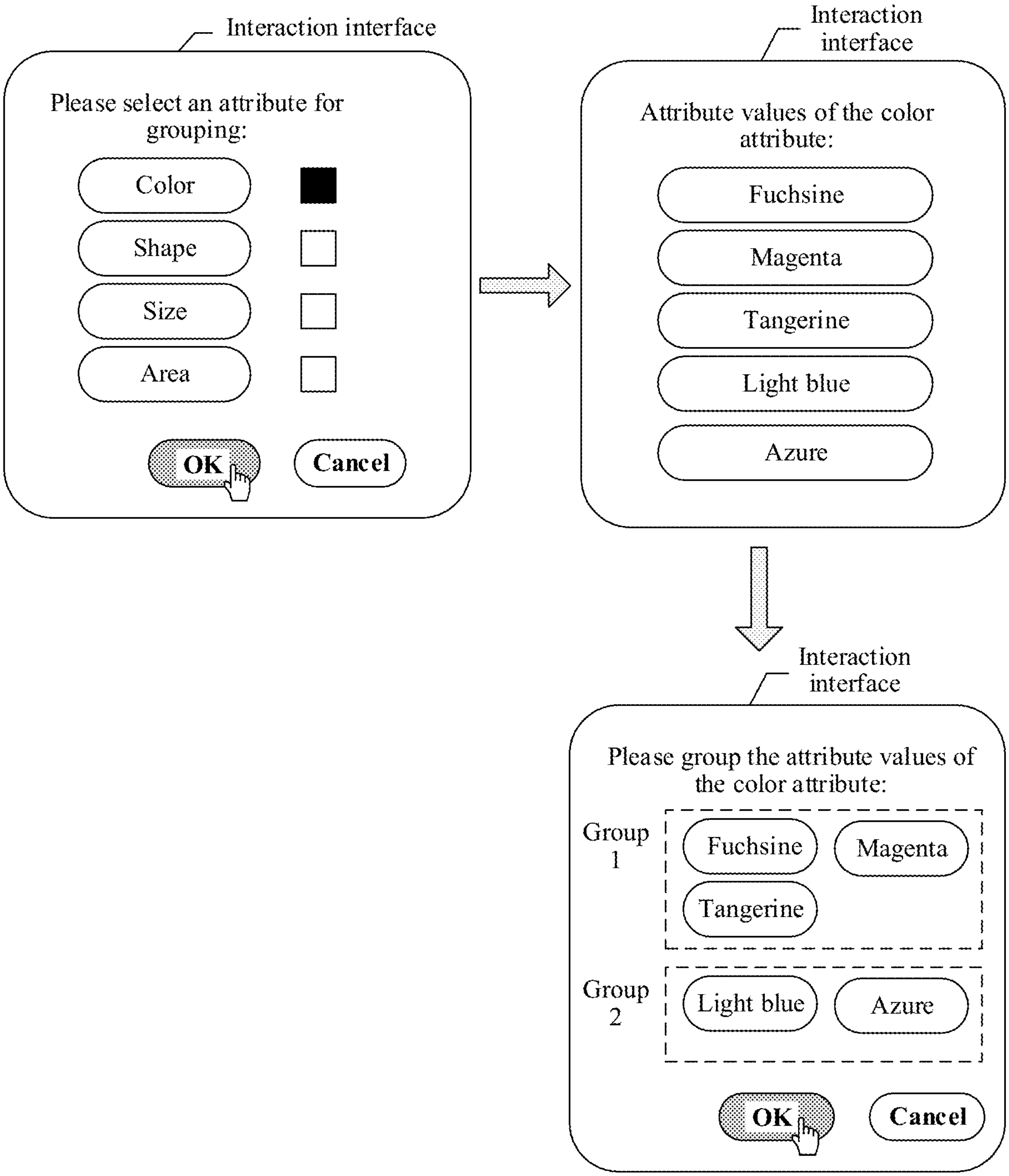
FIG. 6 is a schematic diagram of grouping a plurality of pieces of to-be-processed data by a data owner on an interaction interface according to an embodiment of this application.

In this embodiment, the data owner 100 may group the plurality of pieces of to-be-processed data. In an embodiment, the computing device 101 may obtain a result of grouping the plurality of pieces of to-be-processed data by the data owner 100 on an interaction interface. For example, the computing device 101 may present, to the data owner 100, an interaction interface shown in FIG. 6, where the interaction interface may present a plurality of attributes, for example, "color", "shape", "size", and "area" shown on a left side in FIG. 6, of a plurality of pieces of to-be-processed data (in actual application, the plurality of pieces of to-be-processed data may alternatively have one attribute); and prompt the data owner 100 to select one attribute to group the plurality of pieces of to-be-processed data. For ease of distinguishing, an attribute selected by the data owner 100 is referred to as a target attribute below. The data owner 100 may select the target attribute, for example, the "color" attribute, on the interaction interface in a clicking manner or the like. Correspondingly, the computing device 101 may determine, by traversing the plurality of pieces of to-be-processed data, attribute values of the target attribute in the plurality of pieces of to-be-processed data, and present the attribute values to the data owner 100. For example, when the target attribute is the "color" attribute, the interaction interface may present attribute values, for example, "fuchsia", "magenta", "tangerine", "light blue", and "azure" shown on an upper right side in FIG. 6. In this way, the data owner 100 may further group the plurality of attribute values on the interaction interface based on semantics of the attribute values, and may place, in a same group, attribute values whose semantics belongs to a same semantics type, so that a plurality of attribute value groups may be obtained. Different attribute value groups include different attribute values. For example, as shown on a lower right side in FIG. 6, the data owner 100 may place, in a group 1, to-be-processed data in which attribute values are "fuchsia", "magenta", and "tangerine", and place, in a group 2, to-be-processed data in which attribute values are "light blue" and "azure". Attribute values in to-be-processed data in each group belong to a same type of color system. For example, the attribute values in the to-be-processed data in the group 1 belong to a red color system, and attribute values in the to-be-processed data in the group 2 belong to a blue color system. In actual application, content on the interaction interface shown in FIG. 5 may be further displayed, in an integrated manner, on the interaction interface shown in FIG. 6. This is not limited in this embodiment. Then, for any one of the plurality of attribute value groups, referred to as a target attribute value group below, the computing device 101 may place, in a same group, to-be-processed data having attribute values in the target attribute value group. In this way, the computing device 101 may group the plurality of pieces of to-be-processed data based on attribute values included in each attribute value group, to obtain a plurality of groups corresponding to the plurality of pieces of to-be-processed data. In addition, to-be-processed data in each group has semantics of a same type, and different groups correspond to different semantics types.

In this embodiment, in addition to grouping the attribute values by the data owner 100 to group the to-be-processed data, in other embodiments, the computing device 101 may automatically group the plurality of pieces of to-be-processed data. As an implementation example, the computing device 101 may select one attribute from the plurality of attributes of the plurality of pieces of to-be-processed data as the target attribute by using a random algorithm or in another manner, and obtain, through traversal, attribute values of the target attribute in the plurality of pieces of to-be-processed data. Usually, the computing device 101 may obtain a plurality of different attribute values through traversal. Then, the computing device 101 may perform semantics identification on the attribute values, and place, in a same group based on semantics of the attribute values, attribute values having same or similar semantics. For the plurality of different attribute values, a plurality of different groups may be usually obtained, so that the computing device 101 may group, based on grouping of the attribute values, the to-be-processed data having the attribute values. In a process of grouping the attribute values, the computing device 101 may cluster attribute values having same or similar semantics, so that each clustering type corresponds to one group. Alternatively, one or more semantics types may be preconfigured in the computing device 101. In this way, the computing device 101 may search, based on semantics of each attribute value, for a semantics type to which the semantics of the attribute value belongs, and further place the attribute value in a found semantics type, to group the attribute values; and then group the plurality of pieces of to-be-processed data based on grouping of the attribute values.

It should be understood that the foregoing two implementations are merely used to provide example descriptions of a process in which the computing device 101 obtains the plurality of groups corresponding to the plurality of pieces of to-be-processed data. In actual application, the computing device 101 may obtain, in another manner, the groups to which the to-be-processed data belongs. This is not limited in this embodiment. For example, based on the foregoing two implementations, the computing device 101 may first present an interaction interface shown on the left side in FIG. 6, so that the data owner 100 selects the target attribute from the plurality of attributes on the interaction interface. Then, the computing device 101 may further group the plurality of pieces of to-be-processed data based on the attribute values of the target attribute in a semantics identification manner.

S403: The computing device 101 adds watermarks to to-be-processed data in the target group by using the target group as a granularity.

In this embodiment, the computing device 101 may add the watermarks to the to-be-processed data in the target group. In this way, after the watermarks are added to the to-be-processed data, the to-be-processed data changes within a range of a small amount of to-be-processed data included in the target group, and does not change within a range of the to-be-processed data, thereby alleviating a problem that the data is severely distorted after watermark adding.

In one example, the computing device 101 may encode the obtained watermark data, to obtain a bit string corresponding to the watermark data. For example, the computing device 101 may directly encode the obtained watermark data into a bit string that includes 0s and/or is, or encode the obtained watermark data into another fixed bit string. Alternatively, the computing device 101 may encode the watermark data by using an error-correcting code (ECC), for example, a Hamming code (Hamming code) or a Reed-Solomon code (Reed-Solomon code, RS coding). For example, it is assumed that entered watermark data is "test".

In this case, the computing device 101 may encode the watermark data "test" into a 32-bit bit string "0111 0100 0110 0101 0111 0011 0111 0100" by using an error-correcting code. In this way, robustness of adding the watermark data to the to-be-processed data can be improved.

In addition, the computing device 101 may further encode attribute values of the target attribute in the to-be-processed data in the target group. For example, for the target group, the computing device 101 may exhaustively list possible attribute values of the target attribute in the to-be-processed data in the group, and determine a quantity of different attribute values (referred to as enumerated values below). In this way, a quantity of enumerated values included in the target group may be determined, and a maximum quantity of enumerated values may be further determined from enumerated values respectively included in the plurality of groups, that is, one of the groups includes most enumerated values. In addition, the computing device 101 may collect statistics on a quantity of obtained groups. In this way, the computing device 101 may calculate, based on the maximum quantity of enumerated values included in a single group and the total quantity of groups and based on the following formula (1), a length S for encoding the attribute values of the target attribute in the to-be-processed data in the group:

$$S=\lceil \log_2 L\rceil+\lceil \log_2 N\rceil \quad (1), \text{ where}$$

L represents the quantity of groups, N represents the maximum quantity of enumerated values included in a single group, $\log_2 L$ represents an encoding length used to identify different groups and is rounded up, and $\log_2 N$ represents an encoding length used to identify different enumerated values in a single group and is rounded up.

For example, for a bit string whose encoding length is S, the computing device 101 may use most significant bits whose length is $\log_2 L$ in the bit string to represent a group number, and use least significant bits whose length is $\log_2 N$ in the bit string to represent different enumerated values. This embodiment is not limited to this implementation. For example, alternatively, most significant bits may be used to represent different enumerated values, and least significant bits may be used to represent a group number. Alternatively, when an encoding length is determined, idle bits of a specific quantity may be added based on identification of a group number and enumerated values.

For example, it is assumed that there are four groups: a group 1, a group 2, a group 3, and a group 4, and quantities of enumerated values included in the groups are sequentially 4, 4, 4, and 5. In this case, an encoding length used to identify a group in a bit string is $\lfloor \log_2 4 1=2$, where "00" may be used to identify the group 1, "01" may be used to identify the group 2, "10" may be used to identify the group 3, and "11" may be used to identify the group 4; and an encoding length used to identify different enumerated values in a single group is $\lfloor \log_2 5 1=3$, where "000", "001", "010", "011", and "100" may be used to respectively identify five different enumerated values. In this case, when encoding enumerated values in each group, the computing device 101 may encode the enumerated values into bit strings each including five bits, where two most significant bits are used to identify different groups, and three least significant bits are used to identify different enumerated values in the group. For example, encoded bit strings corresponding to four enumerated values in the group 1 are respectively "00000", "00001", "00010", and "00011", and encoded bit strings corresponding to five enumerated values in the group 4 are respectively "11000", "11001", "11010", "11011", and "11100".

Then, for the target group, the computing device 101 may add the watermarks to the to-be-processed data in the target group, and may modify some bits in encoded bit strings corresponding to attribute values (enumerated values) in the to-be-processed data in the target group into some bits in the encoded bit string corresponding to the watermark data. For example, when adding a watermark to one piece of to-be-processed data in the target group, the computing device 101 may determine, from the encoded bit string corresponding to the watermark data based on a pre-obtained key (key) and a preset hash function H, a start bit of the watermark that needs to be added, and then determine, based on a quantity of enumerated values included in the target group, a target quantity of bits of a watermark added in the target group, where the target quantity is $\lfloor \log_2 N_{target}\rfloor$ (rounded down), and $N_{target}$ represents the quantity of enumerated values included in the target group. Therefore, the computing device 101 may add bits that are of the target quantity and that start from the start bit in the encoded bit string corresponding to the watermark data to the to-be-processed data as the watermark. In another embodiment, the target quantity may be $\lfloor \log_2 N_{min}\rfloor$, where $N_{min}$ is a minimum value of a quantity of enumerated values included in a single group.

For example, it is assumed that the encoded bit string corresponding to the watermark data is the foregoing "0111 0100 0110 0101 0111 0011 0111 0100". When adding a watermark to to-be-processed data whose number is $P_k$ in the target group, the computing device 101 may calculate, by using the following formulas (2) and (3), a start bit idx in the encoded bit string corresponding to the watermark data:

$$idx=H(\text{key}, P_k)\%\, M \quad (2); \text{ and}$$

$$M=|wm|-\lfloor \log_2 N_{target}\rfloor \quad (3), \text{ where}$$

H is the hash algorithm, key is the key, $P_k$ is an identifier of the to-be-processed data to which a watermark is currently added, for example, a primary key (used to uniquely identify the to-be-processed data in the database) of the to-be-processed data in the database, |wm| represents a length of the encoded bit string corresponding to the watermark data and |wm| is 32 in this example, and $\text{len}(L_{target})$ represents the target quantity of bits of a watermark added to the target group.

It is assumed that an encoded bit string corresponding to one piece of to-be-processed data in a group 4 is "11010", and when adding a watermark to the to-be-processed data, the computing device 101 determines, through calculation based on a primary key $P_k$ of the to-be-processed data, the pre-determined key (key), the hash algorithm H, the length |wm| of the encoded bit string corresponding to the watermark data, and the target quantity $\lfloor \log_2 N_{target}\rfloor$ of bits of a watermark added to the target group, that idx is 2. In addition, $\lfloor \log_2 N_{target}\rfloor=2$. In this case, the computing device 101 may determine to consecutively select, starting from the second bit (from left to right) from the encoded bit string "0111 0100 0110 0101 0111 0011 0111 0100" corresponding to the watermark data, two bits as the watermark added to the to-be-processed data. The watermark is "11", namely, the second bit and the third bit in the encoded bit string. In this case, after watermark adding, the encoded bit string corresponding to the to-be-processed data is adjusted from "11010" to "11011" (in this embodiment, for example, the watermark is added to the last two bits in the encoded bit string).

The key (key) and the hash function H that are used to calculate idx may be specified by the data owner 100. For example, the computing device 101 may present an interaction interface to the data owner 100 in advance, so that the data owner 100 may enter a corresponding key (key) and a specific hash algorithm H on the interaction interface. In another possible embodiment, the computing device 101 may set the key (key), the hash function H, and the like. Optionally, a quantity of bits added by the computing device 101 to to-be-processed data in each group as a watermark may be specified by the data owner 100, without being determined by the computing device 101 through automatic calculation.

It is worthwhile to note that, when to-be-processed data in each group obtained by the computing device 101 has semantics of a same type, and different groups correspond to different semantics types, because the computing device 101 adds the watermarks to the to-be-processed data in the target group, after the watermarks are added to the to-be-processed data, the attribute values of the target attribute in the to-be-processed data still fall within an attribute value range corresponding to the target group. In addition, because the attribute values in the target group are similar or the same (belong to a same semantics type), after the watermarks are added to the to-be-processed data, semantics of the attribute values of the target attribute in the to-be-processed data has a relatively small change.

It is worthwhile to note that, for different to-be-processed data with a same attribute value of the target attribute in the target group, because the different to-be-processed data has different primary keys, even if the different to-be-processed data has the same attribute value of the target attribute, watermarks added by the computing device 101 to the different to-be-processed data may be different. For example, when adding watermarks to to-be-processed data 1 and to-be-processed data 2 that have a same encoded bit string "11010", the computing device 101 determines, based on a primary key of the to-be-processed data 1, that a watermark added to an encoded bit string corresponding to the to-be-processed data 1 is "11", and determines, based on a primary key of the to-be-processed data 2, that a watermark added to an encoded bit string corresponding to the to-be-processed data 2 is "00". In this case, after watermark adding, the encoded bit string of the to-be-processed data 1 is changed from "11010" to "11011", and the encoded bit string of the to-be-processed data 2 is changed from "11010" to "11000".

It should be understood that, when a watermark is added to to-be-processed data in the target group, a larger quantity of bits of the added watermark indicates a stronger anti-attack capability of the watermark. For example, it is assumed that the quantity of bits of the watermark added to the target group is 1. In this case, after data of a bit representing the watermark is modified because the to-be-processed data is attacked, the watermark information is lost. If the quantity of bits of the watermark added to the target group is 3, even if data of one bit representing the watermark is modified because the to-be-processed data is attacked, information of two remaining bits representing the watermark is still retained, that is, the watermark has a relatively stronger anti-attack capability.

In actual application, the data owner 100 provides a relatively large quantity of to-be-processed data. Therefore, the watermarks respectively added by the computing device 101 to the plurality of pieces of to-be-processed data may usually cover the bits in the encoded bit string corresponding to the watermark data, so that the complete watermark data can be added to the plurality of pieces of to-be-processed data. After the watermarks are added to the plurality of pieces of to-be-processed data, only attribute values of the target attribute may change, and attribute values of remaining attributes may remain unchanged. In some examples, the computing device 101 may directly send a plurality of pieces of to-be-processed data having the watermarks to the data user 200 by using a network. Alternatively, the computing device 101 may first create a new data set based on the plurality of pieces of to-be-processed data to which the watermarks are added, and then send the new data set to the data user 200. Alternatively, the computing device 101 may replace, with the plurality of pieces of to-be-processed data to which the watermarks are added, the plurality of pieces of to-be-processed data that is stored in the database and that does not have the watermarks, to perform data update on the database.

After providing, for the data user 200, the plurality of pieces of to-be-processed data to which the watermarks are added, when determining that data leakage exists, the data owner 100 may determine, by using the watermarks, whether the data user 200 leaks data.

In some embodiments, the data owner 100 may extract watermark information from a plurality of pieces of leaked to-be-processed data, and determine, through comparison, whether extracted watermarks are consistent with previously used watermarks sent to the data user 200. If the extracted watermarks are consistent with the previously used watermarks sent to the data user 200, the data owner 100 may determine that the data user 200 has data leakage behavior. If the extracted watermarks are inconsistent with the previously used watermarks sent to the data user 200, the data owner 100 may determine that the data user 200 does not leak data. In actual application, when sending data to different data users, the data owner 100 may use watermark data to add watermark information to the provided data.

The following describes a process in which the computing device 101 extracts watermark data from a plurality of pieces of to-be-processed data. In an actual application scenario, the plurality of pieces of to-be-processed data may be collected data that has been leaked to an unauthorized user.

When extracting the watermark data from the plurality of pieces of to-be-processed data, the computing device 101 may first create a corresponding quantity of counters based on a quantity of bits in an encoded bit string corresponding to the watermark data. Each counter is configured to extract, from the plurality of pieces of to-be-processed data, quantities of times that a corresponding bit in the encoded bit string corresponding to the watermark data is 0 and 1.

Then, for each piece of to-be-processed data, the computing device 101 may deduce, based on a primary key $P_k$, a key (key), a hash algorithm H, and a quantity of bits of a watermark added to the to-be-processed data, bits that are of the watermark data and whose values correspond to values of specific bits of encoded bits corresponding to an attribute value of the target attribute in the to-be-processed data, to perform counting, by adding 1, on the values of the bits by using counters corresponding to the bits. For example, it is assumed that the attribute value of the target attribute in the to-be-processed data is encoded into "11011", and the quantity of bits of the watermark added to the to-be-processed data is 2. If it is deduced that a watermark "11" in "11011" is the second bit and the third bit in the encoded bit string corresponding to the watermark data, a counter corresponding to the second bit may be used to add 1 to a quantity of times that a value of the second bit is 1, and a quantity of times that the value of the second bit is 0 remains unchanged; and a counter corresponding to the third bit may be used to add 1 to a quantity of times that a value of the third bit is 1, and a quantity of times that the value of the third bit is 0 remains unchanged. For each piece of to-be-processed data, the computing device 101 may perform the foregoing process. In this way, a counter corresponding to each bit in the encoded bit string of the watermark data completes counting on quantities of times that a value of the corresponding bit is 0 and 1.

Then, for each counter, the computing device 101 may compare a counting result of the counter for a value 0 and a counting result of the counter for a value 1. In an ideal case (for example, in a case in which data is not attacked or no error occurs), in the counting results obtained by the counter, a count for a value 0 or a value 1 is 0, and a count for the other value is not 0. In this case, a value of a bit that is in the encoded bit string of the watermark data and that corresponds to the counter is the value whose count is not 0. For example, it is assumed that counting results of a counter corresponding to the first bit in the encoded bit string of the watermark data indicate that a counting result for a value 0 is 80 and a counting result for a value 1 is 0. In this case, a value of the first bit in the encoded bit string of the watermark data is 0. For another example, it is assumed that counting results of a counter corresponding to the second bit in the encoded bit string of the watermark data indicate that a counting result for a value 0 is 0 and a counting result for a value 1 is 100. In this case, a value of the second bit in the encoded bit string of the watermark data is 1. The rest may be deduced from this.

In actual application, in counting results obtained by a counter, due to an attack or an error in partial data, the counting results of the counter may indicate that neither of counting quantities for a value 0 and a value 1 is 0. In this case, the computing device 101 may compare the counting quantities of the counter for the value 0 and the value 1, and use a value corresponding to a larger counting quantity as a value of a corresponding bit in the encoded bit string of the watermark data. For example, it is assumed that counting results of a counter corresponding to the first bit in the encoded bit string of the watermark data indicate that a counting result for a value 0 is 70 and a counting result for a value 1 is 10. Because the counting result (70) for the value 0 is greater than the counting result (10) for the value 1, the computing device 101 may determine that a value of the first bit in the encoded bit string of the watermark data is 0. For another example, it is assumed that counting results of a counter corresponding to the second bit in the encoded bit string of the watermark data indicate that a counting result for a value 0 is 15 and a counting result for a value 1 is 85. Because the counting result (15) for the value 0 is less than the counting result (85) for the value 1, the computing device 101 may determine that a value of the second bit in the encoded bit string of the watermark data is 1. The rest may be deduced from this.

In this way, values of the bits in the encoded bit string corresponding to the watermark data may be determined by using counting results of the plurality of counters, so that the encoded bit string may be decoded, to obtain the corresponding watermark data through inverse calculation. A process of obtaining the watermark data through decoding based on the encoded bit string is an inverse process of obtaining the bit string through encoding based on the watermark data, and therefore is not described in detail in this embodiment. In this way, the watermark data may be extracted from the plurality of pieces of to-be-processed data, so that the computing device 101 determines, based on the extracted watermark data, whether a data user leaks data.

The foregoing describes, in detail with reference to FIG. 1 to FIG. 6, the method for adding a watermark to data provided in the embodiments of this application. The following describes, from a perspective of a functional unit with reference to the accompanying drawings, an apparatus for adding a watermark to data provided in the embodiments of this application.

Figure 7:
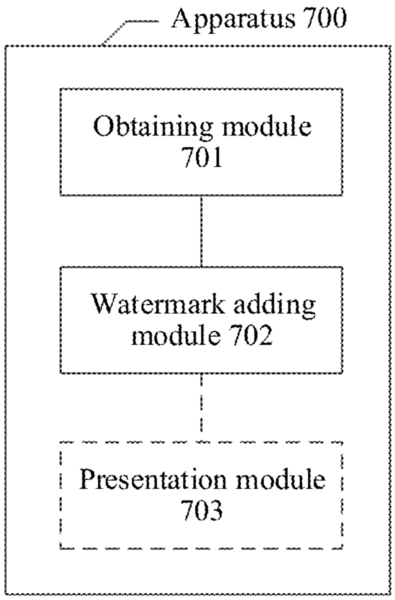
FIG. 7 is a schematic diagram of a structure of an apparatus for adding a watermark to data according to an embodiment of this application.

Referring to a schematic diagram of a structure of an apparatus for adding a watermark to data in FIG. 7, an apparatus 700 may be applied to the computing device 101 shown in FIG. 4, and the apparatus 700 includes:

an obtaining module 701, configured to: obtain a plurality of pieces of to-be-processed data, and obtain a plurality of groups corresponding to the plurality of pieces of to-be-processed data, where the plurality of groups include a target group; and a watermark adding module 702, configured to add watermarks to to-be-processed data in the target group by using the target group as a granularity.

In an embodiment, each piece of to-be-processed data includes an attribute value of a target attribute.

The watermark adding module 702 is configured to add the watermarks to the to-be-processed data in the target group based on attribute values of the target attribute in the to-be-processed data in the target group.

In an embodiment, attribute values of the target attribute in different to-be-processed data in a same group have semantics of a same type, and semantics of attribute values of the target attribute in to-be-processed data in different groups belongs to different types.

In an embodiment, the apparatus 700 further includes:

a presentation module 703, configured to present an interaction interface, where the interaction interface includes a plurality of attribute values of the target attribute in the plurality of pieces of to-be-processed data.

The obtaining module 701 is configured to obtain a result of grouping the plurality of pieces of to-be-processed data by a data owner on the interaction interface.

In an embodiment, the obtaining module 701 is configured to:

obtain a plurality of attribute value groups based on an operation of grouping the plurality of attribute values by the data owner on the interaction interface, where different attribute value groups include different attribute values; and place, in a same group, to-be-processed data having attribute values in a target attribute value group, where the target attribute value group is any one of the plurality of attribute value groups.

In an embodiment, the obtaining module 701 is further configured to receive a key and a hash algorithm that are entered by the data owner on the interaction interface, where the key and the hash algorithm are used to determine the watermarks added to the to-be-processed data in the target group.

In an embodiment, the obtaining module 701 is configured to divide the plurality of pieces of to-be-processed data into a plurality of groups based on attribute values in the plurality of pieces of to-be-processed data.

In an embodiment, the obtaining module 701 is configured to:

identify semantics of the attribute values of the target attribute in the plurality of pieces of to-be-processed data; and divide the plurality of pieces of to-be-processed data into the plurality of groups based on the semantics of the attribute values of the target attribute in the plurality of pieces of to-be-processed data.

In an embodiment, watermark data added to the plurality of pieces of to-be-processed data includes an error-correcting code.

In an embodiment, the target group is any one of the plurality of groups.

The apparatus 700 for adding a watermark to data according to this embodiment of this application may correspondingly perform the method described in the embodiments of this application, and the foregoing and other operations and/or functions of the modules of the apparatus 700 for adding a watermark to data are respectively used to implement the corresponding method procedures performed by the computing device in FIG. 4. For brevity, details are not described herein.

In the foregoing embodiments, a process of adding a watermark to data may be alternatively implemented by a separate hardware device. The following describes in detail a computing device that implements the process of adding a watermark to data.

Figure 8:
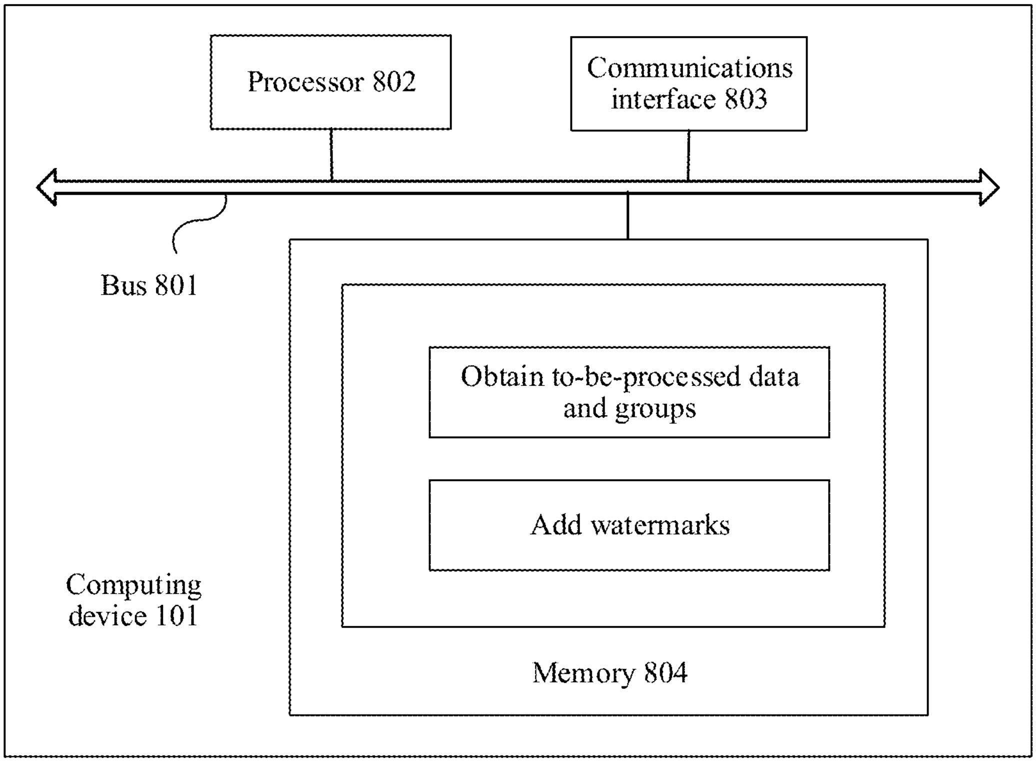
FIG. 8 is a schematic diagram of a structure of a computing device according to an embodiment of this application.

FIG. 8 is a schematic diagram of a structure of a computing device. A computing device 101 shown in FIG. 8 may be configured to implement the function of the computing device 101 in the embodiment shown in FIG. 4.

The computing device 101 includes a bus 801, a processor 802, a communications interface 803, and a memory 804. The processor 802, the memory 804, and the communications interface 803 communicate with each other by using the bus 801. The bus 801 may be a peripheral component interconnect (PCI) bus, an extended industry standard architecture (EISA) bus, or the like. Buses may be classified into an address bus, a data bus, a control bus, and the like. For ease of representation, one bold line is used to represent the bus in FIG. 8, but this does not mean that there is only one bus or only one type of bus. The communications interface 803 is configured to communicate with the outside, for example, receive a target service request sent by a software developer plane function network element.

The processor 802 may be a central processing unit (CPU). The memory 804 may include a volatile memory (volatile memory), for example, a random access memory (RAM). Alternatively, the memory 804 may include a non-volatile memory (non-volatile memory), for example, a read-only memory ROM), a flash memory, an HDD, or an SSD.

The memory 804 stores executable code, and the processor 802 executes the executable code to perform the foregoing method performed by the computing device 101.

For example, when the embodiment shown in FIG. 4 is implemented, software or program code required for performing the function of the computing device 101 in FIG. 4 is stored in the memory 804. Interaction between the computing device 101 and another device is implemented by using the communications interface 803. For example, the computing device 101 obtains a plurality of pieces of to-be-processed data in a data source by using the communications interface 803. The processor is configured to execute instructions in the memory 804, to implement the method performed by the computing device 101.

In addition, an embodiment of this application further provides a computer-readable storage medium. The computer-readable storage medium stores instructions. When the instructions run on a computing device, the computing device is enabled to perform the method in the foregoing embodiment.

An embodiment of this application further provides a computer program product. When the computer program product is executed by a computer, the computer performs any one of the foregoing data providing methods. The computer program product may be a software installation package. When any one of the foregoing data providing methods needs to be used, the computer program product may be downloaded and the computer program product may be executed on a computer.

In addition, it should be noted that the described apparatus embodiment is merely an example. The units described as separate parts may or may not be physically separate, and parts displayed as units may or may not be physical units, that is, may be located in one position, or may be distributed on a plurality of network units. Some or all of the modules may be selected based on actual needs to achieve the objectives of the solutions of the embodiments. In addition, in the accompanying drawings of the apparatus embodiments provided in this application, connection relationships between modules indicate that the modules have communication connections with each other. This may be implemented as one or more communications buses or signal cables.

Based on the foregoing descriptions of the implementations, a person skilled in the art may clearly understand that this application may be implemented by software and necessary universal hardware, or may be certainly implemented by dedicated hardware, including an application-specific integrated circuit, a dedicated CPU, a dedicated memory, a dedicated component, or the like. Generally, any function completed by a computer program can be easily implemented by corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a training device, a network device, or the like) to perform the method in the embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method of embedding a watermark in a structured data set by a computing device, the method comprising:

obtaining a plurality of pieces of to-be-processed data forming the structured data set, each piece of the plurality of pieces of to-be-processed data including a target attribute having a plurality of attribute values;

obtaining a plurality of attribute value groups based on grouping the plurality of attribute values;

obtaining a plurality of groups corresponding to the plurality of pieces of to-be-processed data based on the plurality of attribute value groups, wherein the plurality of groups comprises a target group; and encoding, by the computing device, watermarks to the plurality of pieces of to-be-processed data in the target group by using the target group as a granularity, wherein the encoding comprises assigning, within each of the plurality of attribute value groups, a value identifier to each attribute value in the corresponding one of the plurality of attribute value groups, and representing each target-attribute value by a bit string having a length defined in part by a logarithmic value of a quantity of the plurality of attribute value groups.

2. The method according to claim 1, wherein encoding the watermarks comprises:

adding the watermarks based on the plurality of attribute values of the target attribute in the plurality of pieces of to-be-processed data in the target group.

3. The method according to claim 2, wherein the attribute values of the target attribute in different to-be-processed data in a same group have semantics of a same type, and semantics of attribute values of the target attribute in to-be-processed data in different groups belongs to different types.

4. The method according to claim 2, wherein obtaining the plurality of groups corresponding to the plurality of pieces of to-be-processed data comprises:

dividing the plurality of pieces of to-be-processed data into a plurality of groups based on attribute values in the plurality of pieces of to-be-processed data.

5. The method according to claim 4, wherein the dividing the plurality of pieces of to-be-processed data into a plurality of groups based on attribute values in the plurality of pieces of to-be-processed data comprises:

identifying semantics of the attribute values of the target attribute in the plurality of pieces of to-be-processed data; and dividing the plurality of pieces of to-be-processed data into the plurality of groups based on the semantics of the attribute values of the target attribute in the plurality of pieces of to-be-processed data.

6. The method according to claim 1, further comprising:

presenting an interaction interface, wherein the interaction interface comprises a plurality of attribute values of the target attribute in the plurality of pieces of to-be-processed data; and obtaining the plurality of groups corresponding to the plurality of pieces of to-be-processed data comprises:

obtaining a result of grouping the plurality of pieces of to-be-processed data by a data owner on the interaction interface.

7. The method according to claim 4, wherein obtaining the result of grouping the plurality of pieces of to-be-processed data by a data owner on the interaction interface comprises:

obtaining a plurality of attribute value groups based on an operation of grouping the plurality of attribute values by the data owner on the interaction interface, wherein different attribute value groups comprise different attribute values; and placing, in a same group, to-be-processed data having attribute values in a target attribute value group, wherein the target attribute value group is any one of the plurality of attribute value groups.

8. The method according to claim 6, further comprising:

receiving a key and a hash algorithm that are entered by the data owner on the interaction interface, wherein the key and the hash algorithm are used to determine the watermarks added to the to-be-processed data in the target group.

9. The method according to claim 1, wherein watermark data added to the plurality of pieces of to-be-processed data comprises an error-correcting code.

10. The method according to claim 1, wherein the target group is any one of the plurality of groups.

11. A computing device, comprising:

a processor; and a memory coupled with the processor, wherein the memory is configured to store computer instructions; and when the processor executes the stored computer instructions, the computing device is configured to:

obtain a plurality of pieces of to-be-processed data forming a structured data set, each piece of the plurality of pieces of to-be-processed data including a target attribute having a plurality of attribute values;

obtain a plurality of attribute value groups based on grouping the plurality of attribute values;

obtain a plurality of groups corresponding to the plurality of pieces of to-be-processed data based on the plurality of attribute value groups, wherein the plurality of groups comprise a target group; and encode watermarks to to-be-processed data in the target group by using the target group as a granularity, wherein the encoding comprises assigning, within each of the plurality of attribute value groups, a value identifier to each attribute value in the corresponding one of the plurality of attribute value groups, and representing each target-attribute value by a bit string having a length defined in part by a logarithmic value of a quantity of the plurality of attribute value groups.

12. The computing device according to claim 11, wherein the computing device is configured to: add the watermarks to the to-be-processed data in the target group based on the plurality of attribute values of the target attribute in the to-be-processed data in the target group.

13. The computing device according to claim 12, wherein attribute values of the target attribute in different to-be-processed data in a same group have semantics of a same type, and semantics of attribute values of the target attribute in to-be-processed data in different groups belongs to different types.

14. The computing device according to claim 12, wherein the computing device is configured to divide the plurality of pieces of to-be-processed data into a plurality of groups based on attribute values in the plurality of pieces of to-be-processed data.

15. The computing device according to claim 14, wherein the computing device is configured to:

identify semantics of the attribute values of the target attribute in the plurality of pieces of to-be-processed data; and divide the plurality of pieces of to-be-processed data into the plurality of groups based on the semantics of the attribute values of the target attribute in the plurality of pieces of to-be-processed data.

16. The computing device according to claim 11, wherein the computing device is configured to:

present an interaction interface, wherein the interaction interface comprises a plurality of attribute values of the target attribute in the plurality of pieces of to-be-processed data; and obtain a result of grouping the plurality of pieces of to-be-processed data by a data owner on the interaction interface.

17. The computing device according to claim 16, wherein the computing device is configured to:

obtain a plurality of attribute value groups based on an operation of grouping the plurality of attribute values by the data owner on the interaction interface, wherein different attribute value groups comprise different attribute values; and place, in a same group, to-be-processed data having attribute values in a target attribute value group, wherein the target attribute value group is any one of the plurality of attribute value groups.

18. The computing device according to claim 16, wherein the computing device is configured to receive a key and a hash algorithm that are entered by the data owner on the interaction interface, wherein the key and the hash algorithm are used to determine the watermarks added to the to-be-processed data in the target group.

19. The computing device according to claim 11, wherein watermark data added to the plurality of pieces of to-be-processed data comprises an error-correcting code.

20. The computing device according to claim 11, wherein the target group is any one of the plurality of groups.

* * * * *